US005632233A

United States Patent [19]
Kovach

[11] Patent Number: 5,632,233
[45] Date of Patent: May 27, 1997

[54] ADJUSTABLE LENGTH VEHICLE PET TETHER

[76] Inventor: Tim J. Kovach, 8180 Woodland Shore Dr., Brighton, Mich. 48116

[21] Appl. No.: 465,536

[22] Filed: Jun. 5, 1995

[51] Int. Cl.⁶ .................................. A01K 27/00
[52] U.S. Cl. ........................................ 119/771
[58] Field of Search ........................ 119/769, 770, 119/771, 772, 780

[56] References Cited

U.S. PATENT DOCUMENTS

| | | | |
|---|---|---|---|
| 2,981,230 | 4/1961 | Putnam | 119/780 |
| 4,134,364 | 1/1979 | Boncela | 119/771 X |
| 4,899,694 | 2/1990 | Belluomini | 119/771 |
| 5,033,409 | 7/1991 | Sabot | 119/771 X |
| 5,215,037 | 6/1993 | Allred | 119/771 |
| 5,375,561 | 12/1994 | Gunderson | 119/771 |

FOREIGN PATENT DOCUMENTS 000623260  5/1949  United Kingdom ............ 119/780

*Primary Examiner*—Robert P. Swiatek
*Assistant Examiner*—Yvonne R. Abbot

[57] ABSTRACT

A tether for securing a pet alongside a vehicle. The inventive device includes an elongated member securable to a vehicle. A leash is secured to the elongated member by an adjustable coupling assembly such that both a length of the leash from the elongated member and a point of projection of the leash the elongated member can be selectively configured by an individual.

2 Claims, 4 Drawing Sheets

ADJUSTABLE LENGTH VEHICLE PET TETHER

BACKGROUND OF THE INVENTION

1. Field of the Invention

The present invention relates to animal restraining devices and more particularly pertains to an adjustable length vehicle pet tether for securing a pet alongside a vehicle.

2. Description of the Prior Art

The use of animal restraining devices is known in the prior art. More specifically, animal restraining devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal restraining devices include U.S. Pat. Nos. 5,215,037; 4,854,269; 4,574,741; 4,197,818; 4,134,364; and 3,203,399.

While these devices fulfill their respective, particular objectives and requirements, the aforementioned patents do not disclose an adjustable length vehicle pet tether for securing a pet alongside a vehicle which includes an elongated member securable to the vehicle, and a leash secured to the elongated member by an adjustable coupling assembly such that both a length of the leash from the elongated member and a point of projection of the leash from the elongated member can be selectively configured.

In these respects, the adjustable length vehicle pet tether according to the present invention substantially departs from the conventional concepts and designs of the prior art, and in so doing provides an apparatus primarily developed for the purpose of securing a pet alongside a vehicle.

SUMMARY OF THE INVENTION

In view of the foregoing disadvantages inherent in the known types of animal restraining devices now present in the prior art, the present invention provides a new adjustable length vehicle pet tether construction wherein the same can be utilized for securing a pet alongside a vehicle. As such, the general purpose of the present invention, which will be described subsequently in greater detail, is to provide a new adjustable length vehicle pet tether apparatus and method which has many of the advantages of the animal restraining devices mentioned heretofore and many novel features that result in an adjustable length vehicle pet tether which is not anticipated, rendered obvious, suggested, or even implied by any of the prior art animal restraining devices, either alone or in any combination thereof.

To attain this, the present invention generally comprises a tether for securing a pet alongside a vehicle. The inventive device includes an elongated member securable to a vehicle. A leash is secured to the elongated member by an adjustable coupling assembly such that both a length of the leash from the elongated member and a point of projection of the leash from the elongated member can be selectively configured by an individual.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable length vehicle pet tether apparatus and method which has many of the advantages of the animal restraining devices mentioned heretofore and many novel features that result in an adjustable length vehicle pet tether which is not anticipated, rendered obvious, suggested, or even implied by any of the prior art animal restraining devices, either alone or in any combination thereof.

It is another object of the present invention to provide a new adjustable length vehicle pet tether which may be easily and efficiently manufactured and marketed.

It is a further object of the present invention to provide a new adjustable length vehicle pet tether which is of a durable and reliable construction.

An even further object of the present invention is to provide a new adjustable length vehicle pet tether which is susceptible of a low cost of manufacture with regard to both materials and labor, and which accordingly is then susceptible of low prices of sale to the consuming public, thereby making such adjustable length vehicle pet tethers economically available to the buying public.

Still yet another object of the present invention is to provide a new adjustable length vehicle pet tether which provides in the apparatuses and methods of the prior art some of the advantages thereof, while simultaneously overcoming some of the disadvantages normally associated therewith.

Still another object of the present invention is to provide a new adjustable length vehicle pet tether for securing a pet alongside a vehicle.

Yet another object of the present invention is to provide a new adjustable length vehicle pet tether which includes an elongated member securable to the vehicle, and a leash secured to the elongated member by an adjustable coupling assembly such that both a length of the leash from the elongated member and a point of projection of the leash from the elongated member can be selectively configured.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
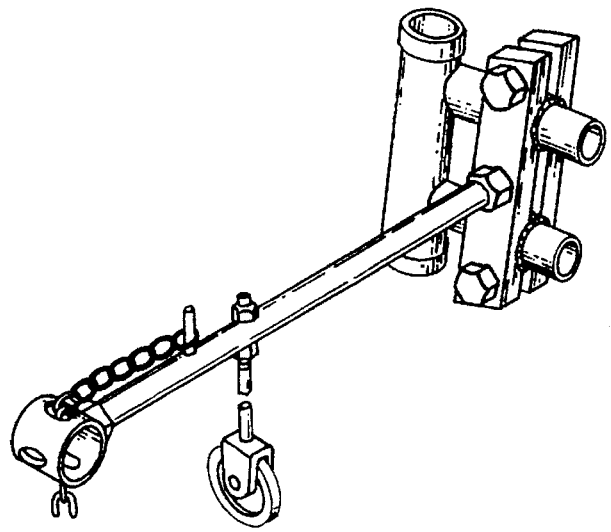
FIG. 1 is an isometric illustration of a prior art animal restraining device.

With reference now to the drawings, and in particular to FIGS. 3–8 thereof, a new adjustable length vehicle pet tether embodying the principles and concepts of the present invention and generally designated by the reference numeral 10 will be described.

Figure 2:
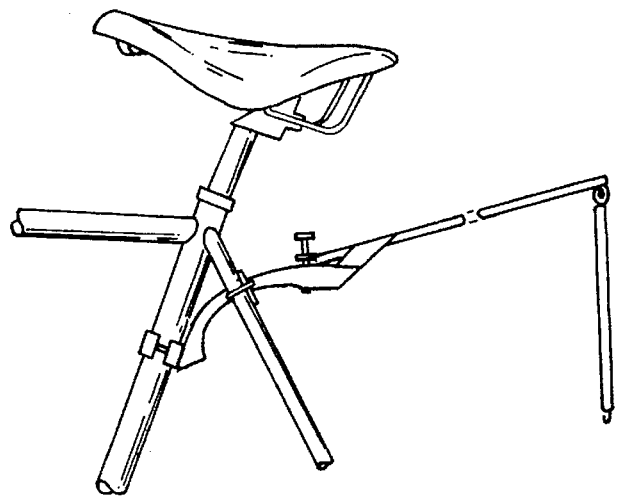
FIG. 2 is an elevation view of a further prior art animal restraining device.
Figure 3:
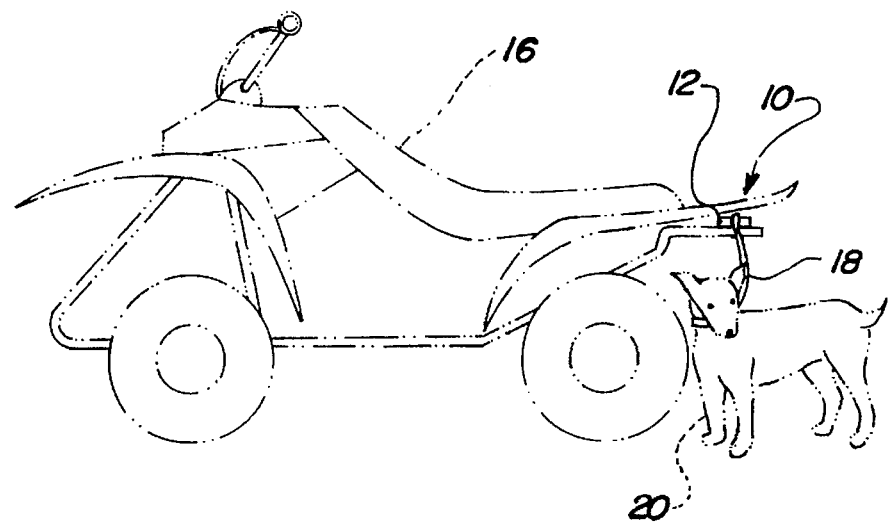
FIG. 3 is a side elevation view of an adjustable length vehicle pet tether according to the present invention in use.

Referring initially to FIGS. 1 and 2 of the drawings wherein prior art animal restraining devices are illustrated, it can be shown that the prior art teaches a tubular member securable to a vehicle so as to project laterally thereof, as shown in FIG. 1 of the drawings, or alternatively a tubular member securable to a rear of a vehicle so as to project rearwardly, as shown in FIG. 2.

Referring now to FIGS. 3 through 8 wherein the present invention 10 is illustrated in detail, it can be shown that the adjustable length vehicle pet tether 10 of the present invention substantially departs from the designs and concepts of the prior art and comprises an elongated member 12 having a longitudinal axis directed therethrough. A mounting means 14 is secured to a first end of the elongated member 12 for securing the elongated member to a vehicle 16 such that the elongated member projects substantially laterally of the vehicle. A leash 18 is provided with the present invention 10 and can be selectively coupled to an animal 20 by conventionally known collar structures or the like. An adjustable coupling means 22, the interior edge of slot 34 is interposed between the leash 18 and the elongated member 12 for coupling the leash to the elongated member such that both a length of the leash from the elongated member and a point of projection of the leash from the elongated member can be selectively configured by an end user to secure the animal 20 within any one of a plurality of zones relative to the vehicle 16.

Figure 4:
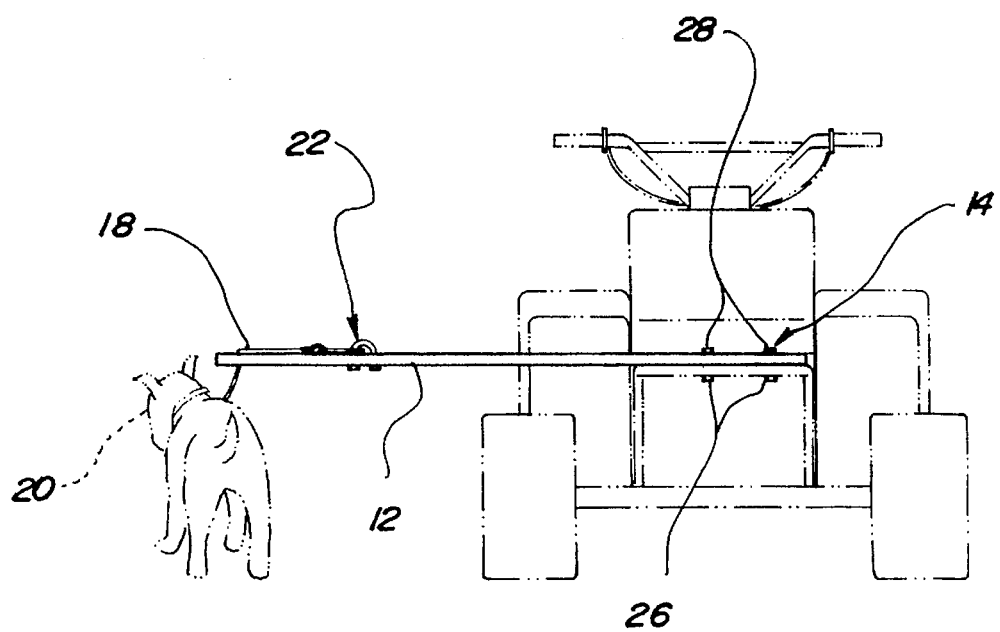
FIG. 4 is a rear elevation view of the invention in use.
Figure 5:
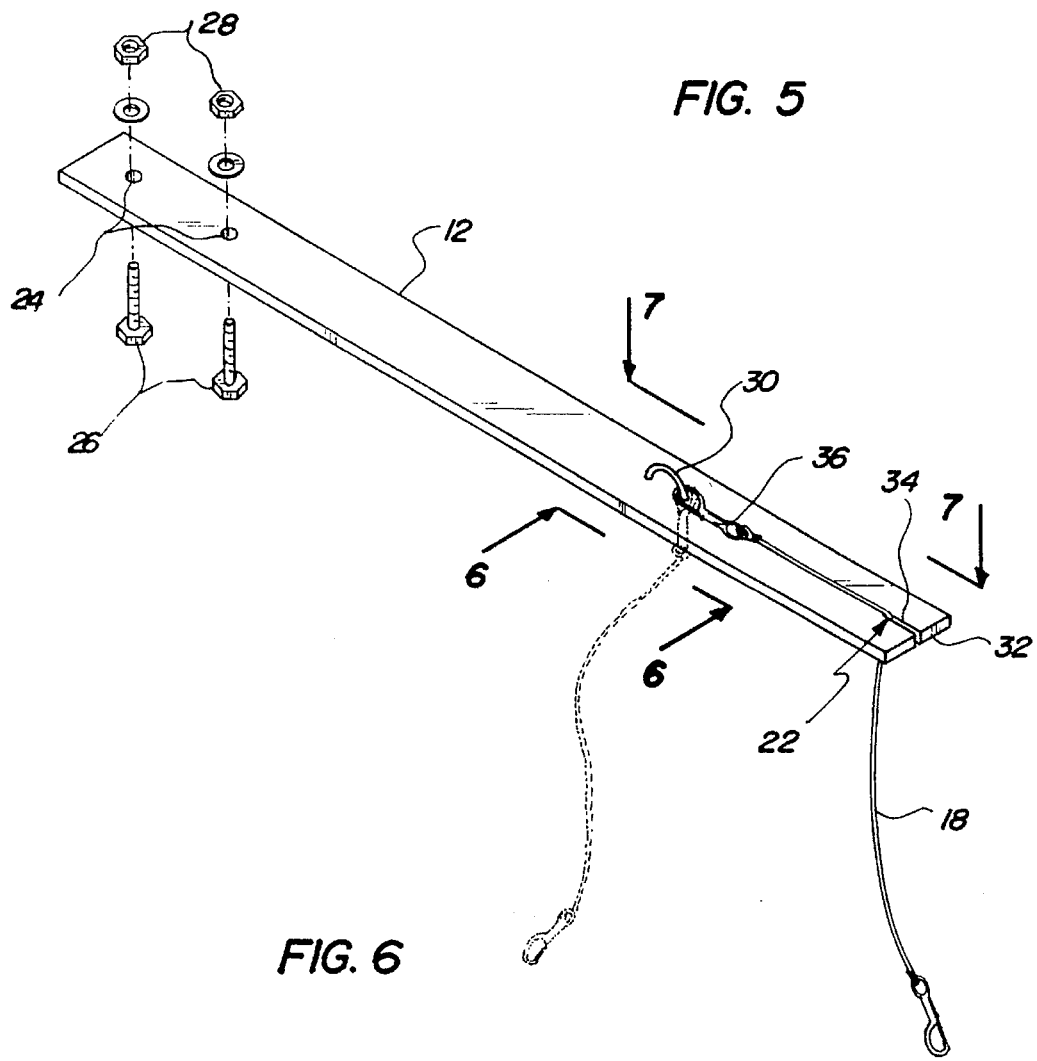
FIG. 5 is an isometric illustration of the present invention, per se.
Figure 6:
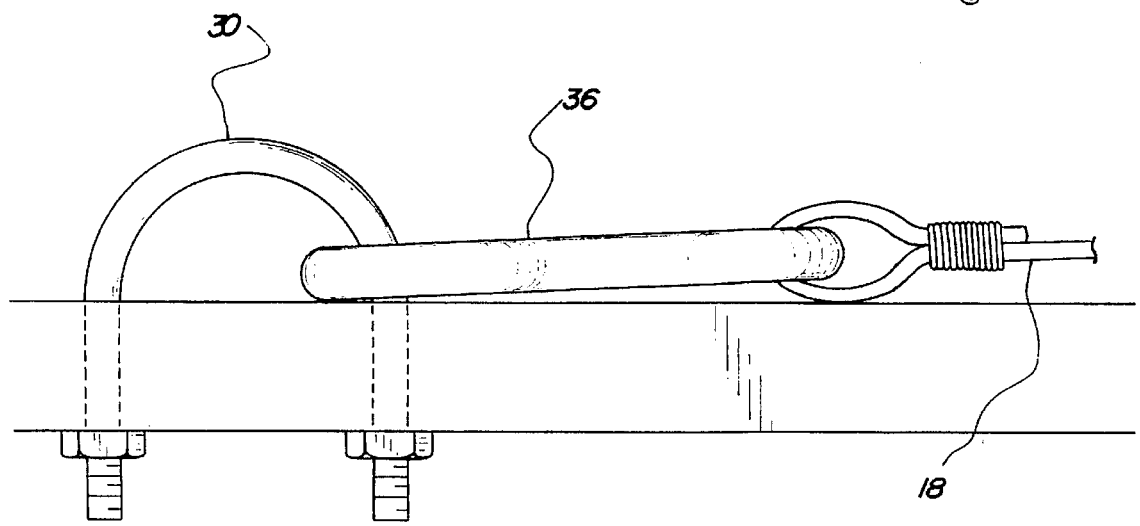
FIG. 6 is an enlarged side elevation view of a portion of the invention taken from line 6—6 of FIG. 5.
Figure 7:
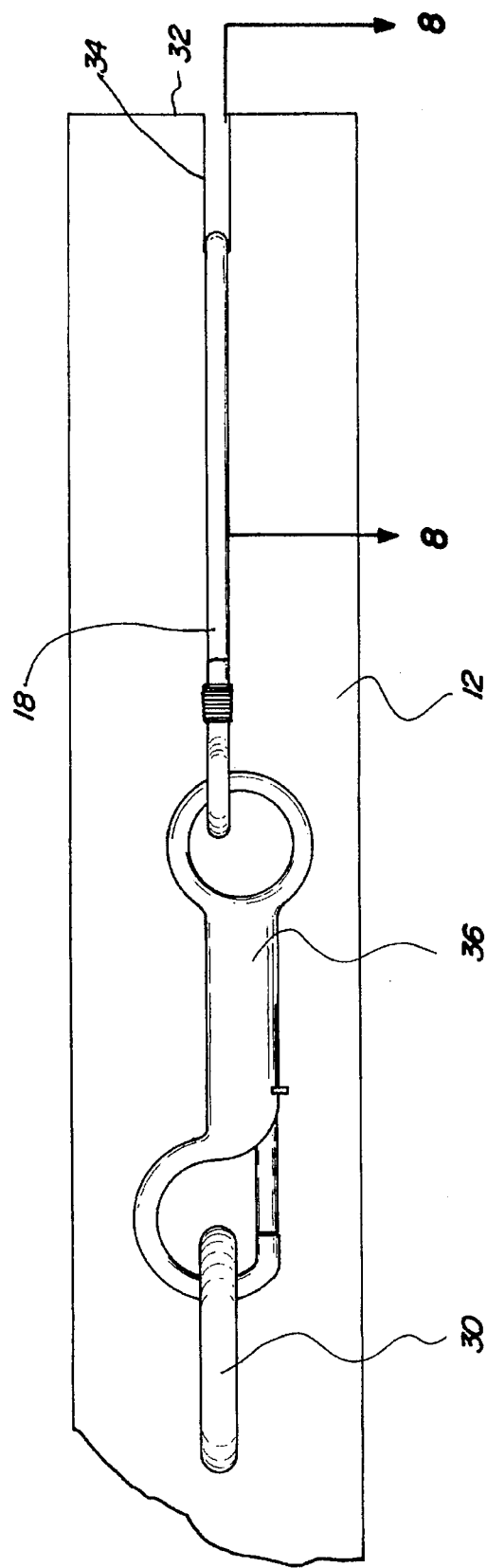
FIG. 7 is a top plan view of a portion of the present invention as seen from line 7—7 of FIG. 5.
Figure 8:
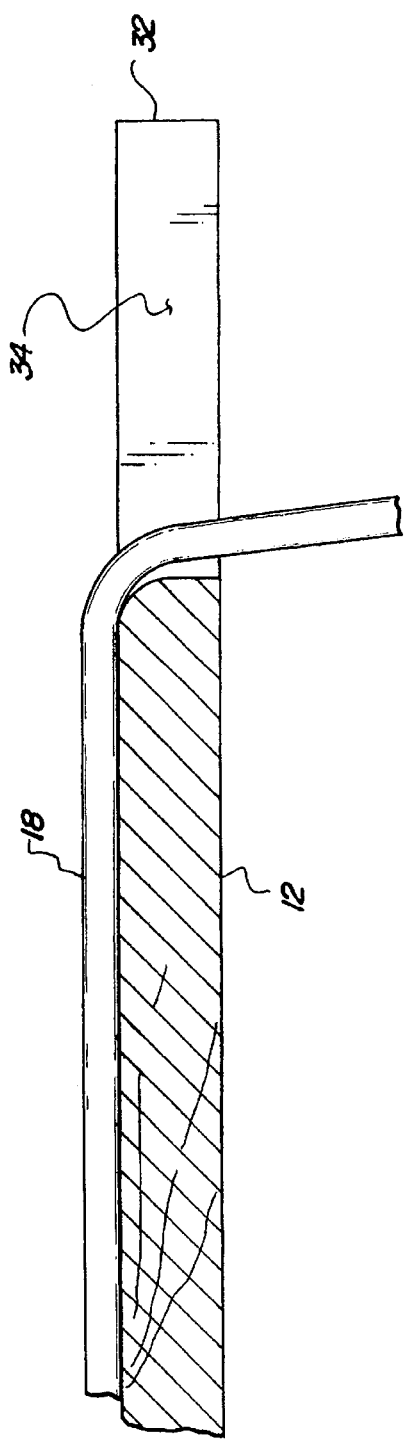
FIG. 8 is a cross-sectional view taken along line 8—8 of FIG. 7.

As best illustrated in FIGS. 4 and 5, it can be shown that the mounting means 14 according to the present invention 10 preferably comprises a pair of spaced mounting apertures 24 directed through the elongated member 12 and oriented so as to extend substantially orthogonally relative to the longitudinal axis thereof. A pair of threaded fasteners 26 are each directed through an individual one of the mounting apertures 24 and cooperate with a pair of securing nuts 28 so as to secure the device 10 relative to a vehicle 16, wherein a projection of the threaded fasteners 26 through unlabelled apertures in the vehicle 16 permits securement of the mounting means 14 relative thereto.

As best illustrated in FIGS. 5 through 8, it can be shown that the adjustable coupling means 22 of the present invention 10, the interior edge of slot 34, supporting leash 18 preferably functions with an anchor loop 30 which is fixedly secured to an upper surface of the elongated member 12 and oriented so as to reside between an inner end of the elongated member 12 whereat the mounting means 14 is positioned, and an outer distal end 32 of the elongated member 12. The elongated member 12 is shaped so as to define a receiving slot 34 directed into the outer distal end 32 of the elongated member 12 and oriented so as to extend substantially parallel to the longitudinal axis of the elongated member. A clip 36 is coupled to the leash 18 and removably coupled to the anchor loop 30 so as to secure the leash 18 relative to the elongated member 12. The leash 18 can then be positioned into the receiving slot 34 as illustrated in FIGS. 5 through 8 so as to secure the leash 18 in a first configuration wherein the leash extends a first distance from the elongated member 12 and projects from the elongated member 12 at a first point proximal to the outer distal end 32 thereof. Further, the leash 18 can be removed from the receiving slot 34 so as to reside in a second configuration, wherein the leash 18 extends freely from the elongated member 12 and projects from the elongated member at a second point oriented remotely from the outer distal end 32 of the elongated member. Thus, the second length of the leash 18 when the device 10 is positioned in the second configuration is substantially greater than the first length of the leash 18 when the device 10 is positioned in the first configuration. As a result, the animal is confined to a first zone of a predetermined area centered beneath the outer distal end 32 of the elongated member 12 when the device is in the first configuration, with the animal being confined to a second zone of a predetermined area substantially greater than the area of the first zone which is centered below the anchor loop 30 of the elongated member 12. The adjustable coupling means 22 thus provides for restricting of the animal 20 relative to the elongated member 12 and the attained vehicle 16 as desired by an end user.

In use, the adjustable length vehicle pet tether 10 according to the present invention can be easily utilized for securing a pet alongside a vehicle, whereby forward motion of the vehicle 16 will lead the animal 20 in a desired direction. The present invention can be easily utilized to walk or otherwise exercise a pet or animal 20 in cooperation with the vehicle 16 when attached to the vehicle as described above.

As to a further discussion of the manner of usage and operation off the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable length vehicle pet tether comprising:

an elongated member having a longitudinal axis directed therethrough;

a mounting means secured to a first end of the elongated member for securing the elongated member to a vehicle such that the elongated member can project substantially laterally of the vehicle;

a leash adapted for coupling to an animal, the leash being secured to the elongated member;

an adjustable coupling means interposed between the leash and the elongated member for coupling the leash to the elongated member such that both a length of the leash from the elongated member and a point of projection of the leash from the elongated member can be selectively adjusted;

mounting means comprising a pair of spaced mounting apertures directed through the elongated member and oriented so as to extend substantially orthogonally relative to the longitudinal axis thereof; a pair of threaded fasteners each being directed through an individual one of the mounting apertures and cooperating with a pair of securing nuts so as to permit securement of the elongated member to a vehicle; and adjustable coupling means comprising an anchor loop fixedly secured to an upper surface of the elongated member and oriented so as to reside between an inner end of the elongated member where the mounting means is positioned and an outer distal end of the elongated member, the elongated member being shaped so as to define a receiving slot directed into the outer distal end of the elongated member and oriented so as to extend substantially parallel to the longitudinal axis of the elongated member; a clip coupled to the leash and removably coupled to the anchor loop so as to secure the leash relative to the elongated member, wherein the leash is adapted to be positioned into the receiving slot to secure the leash in a first configuration wherein the leash may extends a first distance from the elongated member and may projects from the elongated member at first point proximal to the outer distal end thereof, and further wherein the leash is adapted to be removed from the receiving slot so as to reside in a second configuration wherein the leash may extends a second distance from the elongated member and may projects from the elongated member at a second point oriented freely with respect to the elongated member.

2. The adjustable length vehicle pet tether of claim 1, wherein the second distance of the leash when the leash is positioned in the second configuration is adapted to be substantially greater than the first distance of the leash when the leash is positioned in the first configuration such that an animal is adapted to be confined to a first zone of a predetermined area centered between the outer distal end of the elongated member when the leash is in the first configuration, with the animal being confinable within a second zone of a predetermined area substantially greater than the area of the first zone which is centered below the anchor loop of the elongated member when the leash is in the second configuration.

* * * * *